Dec. 10, 1957     H. L. VANDENBERG     2,815,959
SWIVEL JAW FOR CHUCKING IRREGULAR SURFACED WORKPIECES
Filed Aug. 5, 1955                          2 Sheets-Sheet 1
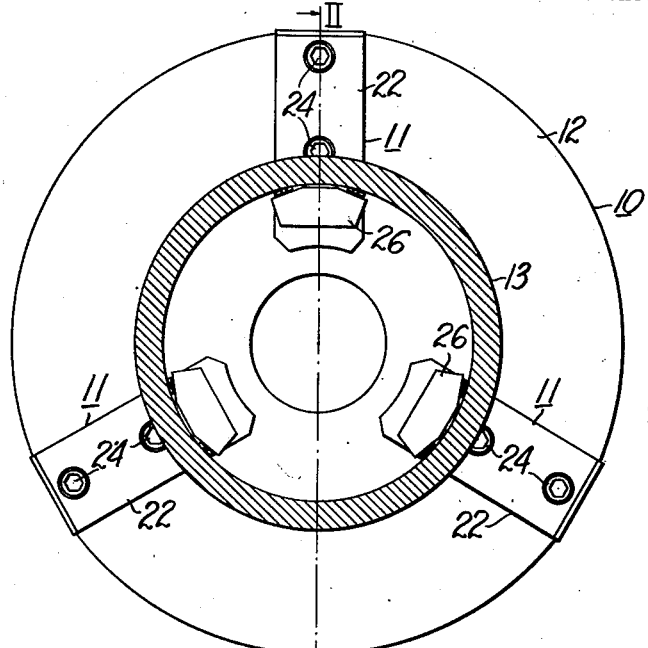
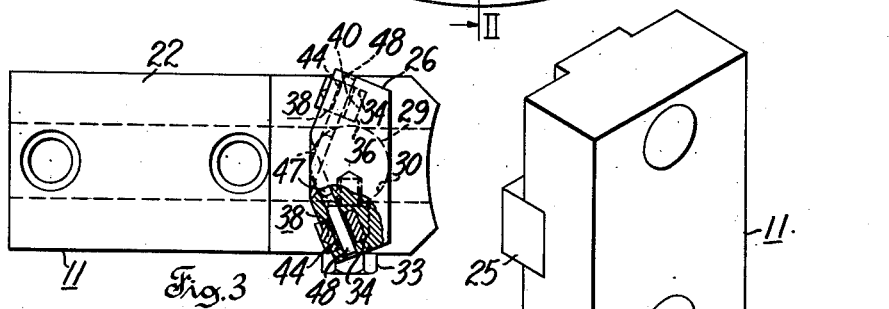
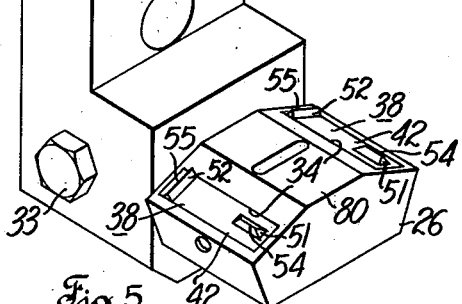
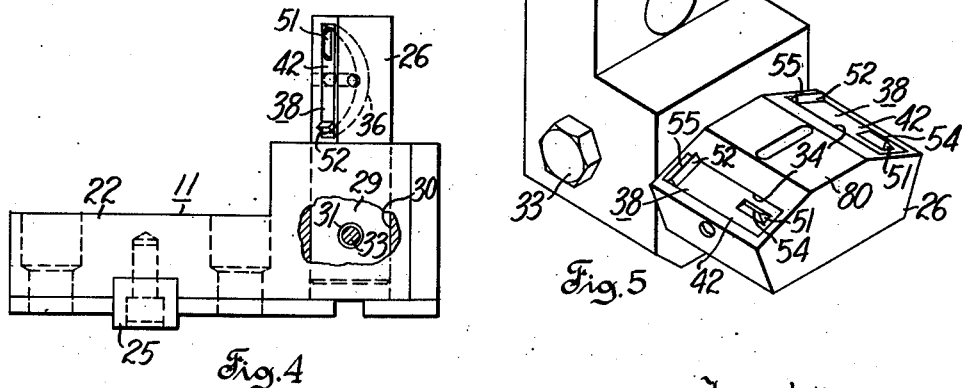
Inventor
Howard L. Vandenberg
by Robert B. Benson
Attorney Dec. 10, 1957  H. L. VANDENBERG  2,815,959
SWIVEL JAW FOR CHUCKING IRREGULAR SURFACED WORKPIECES
Filed Aug. 5, 1955  2 Sheets-Sheet 2

Inventor
Howard L. Vandenberg
By Robert B. Benson
Attorney

United States Patent Office 2,815,959
Patented Dec. 10, 1957

2,815,959

SWIVEL JAW FOR CHUCKING IRREGULAR SURFACED WORKPIECES

Howard L. Vandenberg, Cincinnati, Ohio, assignor to Allis-Chalmers Manufacturing Company, Milwaukee, Wis.

Application August 5, 1955, Serial No. 526,591

11 Claims. (Cl. 279—123)

This invention relates generally to chucks for machine tools. More specifically this invention relates to a chuck having swivel jaws for chucking machinable workpieces having irregular surfaces.

When workpieces having irregular surfaces are machined, a chuck having a plurality of standard hardened jaws is frequently used to grip and hold a workpiece as it is turned in a machine tool such as a lathe. The standard jaws often provide an inadequate grip on the workpiece, since each jaw may make only single point contact with the workpiece. When using chucks having jaws that provide such unreliable grips it is almost impossible to establish consistent machining practices because feeds or speeds of the machine that are satisfactory for one workpiece may tear the next workpiece out of the chuck.

When using chucks having standard jaws to grip and hold a workpiece having ring or rim sections in a machine tool, the machine tool operator often tightens the jaws of the chuck too much in an effort to improve the grip of the chuck on the workpiece. The excessive tightening of the jaws of the chuck on the workpiece generally causes distortion in the workpiece.

The chuck of this invention has swivel jaws that are detachably mounted on the master jaws of the chuck. Each jaw has a swivel block that swivels about an axis perpendicular to the face of the chuck and includes spaced apart rockers that swivel about an axis parallel to the face of the chuck. Each rocker has outwardly extending surfaces, such as teeth, positioned at either end of the top of the rocker for engaging the workpiece. The swivel action of the swivel jaws and rockers insures that each jaw of the chuck has a minimum four point contact with the workpiece. The positive four point contact of each jaw with the workpiece provides the chuck of this invention with a tighter grip and a better distribution of forces causing less distortion on the workpiece than prior art chucks having standard jaws. Furthermore the reliable grip provided by positive four point contact of each jaw with the workpiece makes it possible to establish consistent machining practices regarding such things as feeds and speeds of the machine, and the number of tools that can be applied to the work simultaneously.

Therefore it is the object of this invention to provide a chuck that has a reliable grip on irregularly surfaced machinable workpieces.

Another object of this invention is to provide a chuck that makes it possible to establish consistent machining practices.

Another object of this invention is to provide a chuck that provides a tight grip on the workpiece with a minimum of distortion resulting from the tight grip.

Objects and advantages other than those above set forth will be apparent from the following description when read in conjunction with the drawing.

Fig. 1 is a front view of a chuck embodying the invention, the chuck being shown engaging the wall of an internal cylindrical cavity in a workpiece;

Fig. 3 is an enlarged front view of one of the swivel jaws of the chuck with parts removed;

Fig. 4 is a side view of the jaw shown in Fig. 2 with parts removed;

Fig. 5 is an isometric view of one of the jaws of the chuck;

Figure 2:
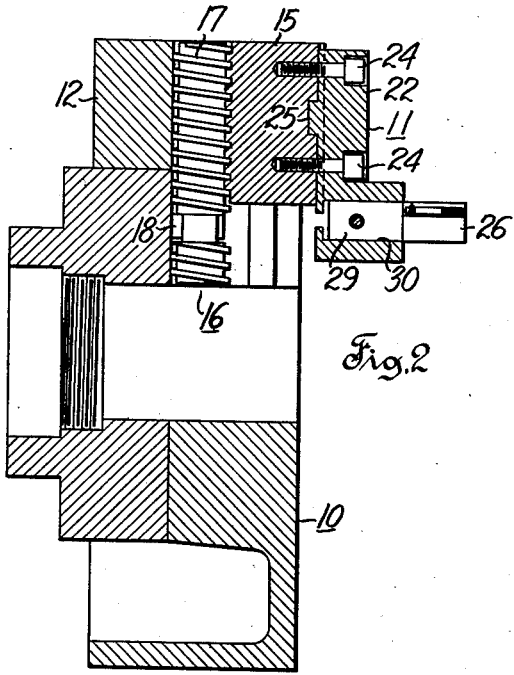
Fig. 2 is a section taken along the line II—II of Fig. 1 with parts removed.
Figure 6:
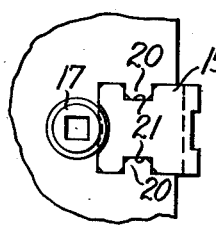
Fig. 6 is a top view of one of the jaws and screw arrangement of Fig. 2.

As shown in Fig. 1, the invention is illustrated in a lathe chuck 10 and comprises a plurality of swivel jaws 11 adjustably mounted on the body 12 of the chuck 10 for engaging the wall of an internal cylindrical cavity in the workpiece 13. The swivel jaws 11 of this invention may be used on either a universal chuck in which the jaws move in unison or an independent chuck in which the jaws operate independently Each swivel jaw 11 is adjustably mounted on the body 12 for radial movement relative to the body 12 of the chuck 10. The swivel jaw 11 may be adjustably mounted on the body 12 of the chuck 10 by any suitable means, but preferably as shown in Fig. 2 the swivel jaw 11 of this invention is mounted in a master jaw 15 which is adjustably mounted in the body 12 of the chuck 10. A master jaw is used because it is designed to receive for mounting a variety of work engaging jaws. The master jaw 15 is adjustably mounted on the body 12 by any suitably adjustable means but preferably as shown in Fig. 2 a screw arrangement 16 is used. The screw arrangement 16 comprises a radially extending screw 17 mounted in the body 12 and radially restrained therein by projections 18. The body 12 has ribs 20, shown in Fig. 6, which fit into the grooves 21 in the master jaw 15 for mounting the master jaw 15 in the body 12. The master jaw 15 threadedly engages the screw 17 for radial movement relative to the body.

Each swivel jaw 11 has a base 22 which is detachably mounted on a master jaw 15 by mounting screws 24. A key 25, as shown in Fig. 4, is provided for locating and holding the base 22 on the master jaw 15.

As shown in Figs. 3 and 4, a swivel block 26 is mounted on the base 22 in swivel relation thereto on an axis parallel to the axis of the chuck 10. Preferably as shown the swivel block 26 has a shank 29 which is positioned within an axially extending bore 30 in the base 22 for mounting the swivel block 26 in the base 22 in a position to swivel around an axis parallel to the axis of the chuck 10. The shank 29 is provided with a radially extending clearance hole 31. Means for limiting the swivel movement of block 26 comprise a bolt 33 having a smaller diameter than the diameter of the clearance hole 31, the bolt 33 being removably anchored in the base 22 and extending into the clearance hole 31. The bolt 33 cooperates with the clearance hole 31 to prevent axial displacement of the block 26 relative to the base 22 and to limit the swivel action of the block 26.

The swivel block 26 has two spaced apart slots 34 substantially parallel to and positioned one on either side of the swivel axis of the swivel block 26. The slots 34 have arcuate bottoms 36, and are cut into the face of the swivel block 26 that is presented to the wall of the cylindrical cavity in the workpiece.

Figure 7:
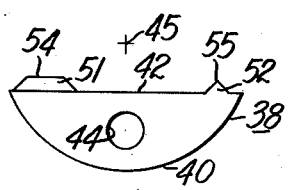
Fig. 7 is a side view of a rocker of a jaw of the chuck.

As shown in Figs. 3 and 4, rockers 38, preferably having arcuate bottoms 40 substantially similar to the arcuate bottoms 36 of the slots 34, are positioned in the slots 34. The rockers 38 may be of any suitable size but preferably, as shown in Figs. 1, 3, 4 and 5, the face 42 of the rockers 38 is flush with the surface of the swivel block 26 into which the slots 34 are cut. Means are provided for preventing the displacement of the rockers 38 relative to the slots 34 in the swivel block 26 and to limit the swivel action of the rockers 38 relative to the swivel block 26. Preferably as shown in Fig. 7 each rocker 38 has an axially extending clearance hole 44 passing therethrough positioned between the arcuate bottom 40 of the rocker 38 and the center of curvature 45 of the bottom 40 of the rocker 38. As shown in Figs. 3 and 4 holes 47 of smaller diameter than holes 44 are positioned in the swivel block 26 on either side of the slots 34 in alignment with the clearance hole 44. A retaining pin 48 having a smaller diameter than the diameter of the clearance hole 44 is press fitted into the holes 47 in the swivel block 26 and passes through the clearance hole 44 to prevent excessive displacement of the rockers 38 relative to the swivel block 26.

When the rockers 38 are positioned in the slots 34 and the retaining pin 48 is extended through the clearance hole 44 the rockers 38 are free to pivot around the center of curvature 45 of said arcuate bottom 40 in a limited swivel relation to the swivel block 26.

The rocker 38, after having swiveled excessively in either direction, engages the retaining pin 48 and the further movement of the rocker in that direction is restricted.

Each rocker 38 is provided with a face 42 having outwardly extending portions shown as teeth 51 and 52 for engaging the wall of the internal cylindrical cavity in the workpiece 13. Preferably the teeth 51 and 52 are pyramidal in shape and are positioned at either end of the face 42 of the rockers 38. The ridge 54 of one of the pyramidal shaped teeth 51 is positioned essentially parallel to the axis of the chuck 27. The ridge 55 of the other tooth 52 forms substantially a 90° angle with the ridge 54 of the first tooth 51.

Each rocker 38 swivels in a plane that is substantially perpendicular to the plane in which the block 26 swivels. The block 26 swivels in a plane perpendicular to the axis of the workpiece 13 and the rockers 38 swivel in a plane extending substantially parallel to the axis of the workpiece 13 to assure that each tooth 51, 52 on every rocker 38 engages the workpiece 13. Hence each swivel jaw 11 of the chuck 10 makes a solid four point contact with the wall of the internal cylindrical cavity in the workpiece 13.

The minimum four point contact of each jaw on the wall of the internal cylindrical cavity in the workpiece assures a reliable grip that will permit consistent machining practices. The reliable grip is easily obtained and there will be no need to excessively tighten the jaws of the chuck on the workpiece. Hence undue distortion of the workpiece due to excessive tightening of the jaws of the chuck on the workpiece is eliminated.

In operation, the swivel jaws 11 move radially relatively to the body 12 of the chuck 10. As the swivel block 26 approaches the wall of the internal cylindrical cavity in the workpiece 13 one of the rockers 38 engages the workpiece and causes the block 26 to swivel until the other rocker 38 engages the workpiece 13. When only one tooth of a rocker makes the initial contact with the workpiece the rocker swivels until the other tooth makes contact with the workpiece. Hence both teeth of every rocker engage the workpiece. By positioning the ridge of one of the teeth substantially parallel to the axis of the chuck 27 and the ridge of the other tooth at right angles with the first ridge, a good grip is assured because one ridge will prevent circumferential displacement of the workpiece and the other ridge will prevent axial displacement of the workpiece.

Figure 8:
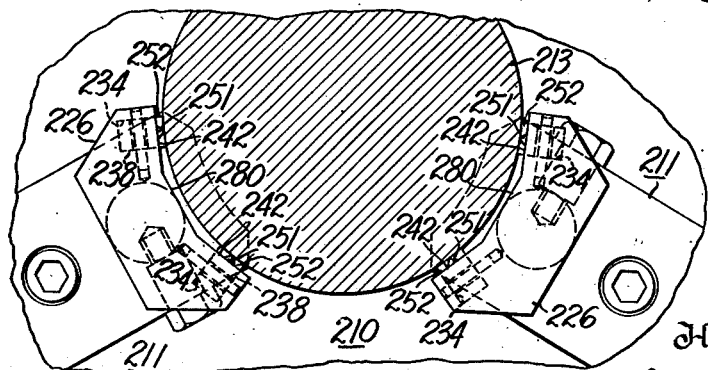
Fig. 8 is a front view of part of a chuck embodying this invention shown engaging the periphery of a workpiece.

Fig. 8 is an illustration of part of a chuck 210 embodying the invention in which the swivel jaws 211 are positioned in the chuck 210 so they engage the workpiece 213 at the outer periphery thereof rather than engaging the wall of an internal cylindrical cavity in the workpiece. Accordingly the face 280 of the swivel block 226 as shown in Fig. 8 is substantially concave as compared to substantially convex face 80 of the swivel block 26 of the first embodiment as illustrated in Fig. 5. Two slots 234 are cut into face 280 of the swivel block 226 that is presented to the periphery of the workpiece 213. As in the first embodiment the slots 234 are substantially parallel to and positioned one on either side of the swivel axis of the swivel block 226. Rockers 238 are positioned in the slots 234 and secured therein in the same manner as the rockers 38 of the first embodiment are secured in the slots 34. The teeth 251 and 252 are positioned on the face 242 of the rockers 238 in the same way as the teeth 51 and 52 are positioned on the face 42 of the rockers 38 as shown in the first embodiment.

The swivel jaws 211 of the chuck 210 operate in the same way as the swivel jaws of the first embodiment except that the swivel jaws 211 engage the outer periphery of the workpiece 213 rather than the wall of an internal cylindrical concave in the workpiece.

Although but two embodiments have been shown and described, it will be apparent to those skilled in the art that various changes and modifications may be made therein without departing from the spirit of the invention or from the scope of the appended claims.

It is claimed and desired to secure by Letters Patent:

1. A chuck comprising a body and a plurality of movable jaws for engaging a workpiece, each of said jaws comprising a base, means for mounting said base on said body in radially adjustable relation thereto, a swivel block mounted in said base in swivel relation thereto about an axis substantially parallel to the axis of said chuck, said swivel block defining two spaced apart slots, said slots being substantially parallel to and positioned one on either side of the swivel axis of said swivel block, said swivel block being positionable to present said slots to the workpiece, rockers partially enclosed in said slots in swivel relation to said block, means connected to the surface of said block defining said rockers and said slots for limiting the displacement of said rockers relative to said block, each of said rockers having a face forming outwardly extending portions for engaging the workpiece, one of said portions being positioned at one end of said face and another of said portions being positioned at the other end of said face, whereby each of said jaws of said chuck provides a minimum positive four point contact when said chuck is engaging the workpiece.

2. A chuck comprising a body and a plurality of movable jaws for engaging the wall of an internal cavity in a workpiece, each of said jaws comprising a base, means for mounting said base on said body in radially adjustable relation thereto, a swivel block mounted in said base in swivel relation thereto about an axis substantially parallel to the axis of said chuck, said swivel block defining two spaced apart slots, said slots being substantially parallel to and positioned one on either side of the swivel axis of said swivel block, said swivel block being positionable to present said slots to the wall of the internal cavity in the workpiece, rockers partially enclosed in said slots in swivel relation to said block, means connected to the surface of said block defining said rockers and said slots for limiting the displacement of said rockers relative to said block, each of said rockers having a face forming outwardly extending portions for engaging the wall of the internal cavity in the workpiece, one of said portions being positioned at one end of said face and another of said portions being positioned at the other end of said face, whereby each of said jaws of said chuck provides a minimum positive four point contact when said chuck is engaging the workpiece.

3. A chuck comprising a body and a plurality of movable jaws for engaging the wall of an internal cavity in a workpiece, each of said jaws comprising a base, means for mounting said base on said body in radially adjustable relation thereto, a swivel block mounted in said base in limited swivel relation thereto about an axis parallel to the axis of said chuck, said swivel block defining two spaced apart slots having arcuate bottoms cut into the swivel block surface, said block being positionable to present said surface to the wall of the internal cavity in the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming two outwardly extending portions for engaging the wall of the internal cavity in the workpiece, the first of said portions being positioned at one end of said face, the other of said portions being positioned at the other end of said face, whereby each of said jaws of said chuck provides a minimum positive four point contact when said chuck is engaging the workpiece.

4. A chuck comprising a body and a plurality of movable jaws for engaging the wall of an internal cavity in a workpiece, each of said jaws comprising a base, means for mounting said base on said body in radially adjustable relation thereto, a swivel block mounted in said base in limited swivel relation thereto about an axis parallel to the axis of said chuck, said swivel block defining two spaced apart slots having arcuate bottoms cut into the swivel block surface, said block being positionable to present said surface to the wall of the internal cavity in the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming outwardly extending teeth for engaging the wall of the internal cavity in the workpiece, the first of said teeth being positioned at one end of said face, the other of said teeth being positioned at the other end of said face, whereby said jaw of said chuck provides a minimum positive four point contact when said chuck is engaging the wall of the internal cavity in the workpiece.

5. A chuck comprising a body and a plurality of movable jaws for engaging the periphery of a workpiece, each of said jaws comprising a base, means for mounting said base on said body in radially adjustable relation thereto, a swivel block mounted in said base in swivel relation thereto about an axis parallel to the axis of said chuck, said swivel block defining two spaced apart slots having arcuate bottoms cut into the swivel block surface, said block being positionable to present said surface to the periphery of the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming outwardly extending pyramidal teeth for engaging the workpiece, the first of said teeth being positioned at one end of said face, the other of said teeth being positioned at the other end of said face, whereby said jaw of said chuck provides a positive four point contact when said chuck is engaging the periphery of the workpiece.

6. A chuck comprising a body and a plurality of movable jaws for engaging the wall of a generally cylindrical internal cavity in a workpiece, each of said jaws comprising a base, means for mounting said base on said body in radially adjustable relation thereto, a swivel block mounted in said base in swivel relation thereto about an axis parallel to the axis of said chuck, said swivel block defining two spaced apart slots having arcuate bottoms cut into the swivel block surface, said block being positionable to present said surface to the wall of the cavity in the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming outwardly extending pyramidal teeth for engaging the workpiece, the first of said teeth being positioned at one end of said face, the other of said teeth being positioned at the other end of said face, whereby said jaw of said chuck provides a positive four point contact when said chuck is engaging the workpiece.

7. A lathe chuck comprising a body and a plurality of movable jaws for engaging the wall of a generally cylindrical cavity in a workpiece, each of said jaws comprising a base, means for mounting said base on said body in radially adjustable relation thereto, a swivel block mounted in said base in limited swivel relation thereto about an axis substantially parallel to the axis of said chuck, said swivel block defining two spaced apart slots having arcuate bottoms cut into the swivel block surface, said block being positionable to present said surface to the wall of the cavity in the workpiece, the slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming outwardly extending pyramidal teeth for engaging the workpiece, the first of said teeth being positioned at one end of said face and having a ridge parallel to said swivel axis, the other of said teeth being positioned at the other end of said face and having a ridge at a 90° angle with said ridge of said first of said teeth, whereby said jaw of said chuck provides a minimum positive four point contact when said chuck is engaging the workpiece.

8. A lathe chuck comprising a body and a plurality of movable jaws for engaging the wall of a generally cylindrical cavity in a workpiece, each of said jaws comprising a base, means for mounting said base on said body in radially adjustable relation thereto, a swivel block mounted in said base in limited swivel relation thereto about an axis parallel to the axis of said chuck, said swivel block defining two spaced apart slots having arcuate bottoms cut into the swivel block surface, said block being positionable to present said surface to the wall of the cavity in the workpiece, said slots extending substantially parallel to and positioned one on either side of said swivel axis of said swivel block, rockers partially enclosed in said slots, each of said rockers having a clearance hole in the portion of said rocker enclosed in said slot, a retaining pin anchored in said swivel block and extending through said clearance hole for securing said rocker in the corresponding said slot in limited rocking relation to said swivel block and forming a limit stop for said rocker, each of said rockers having a face forming outwardly extending pyramidal teeth for engaging the workpiece, the first of said teeth being positioned at one end of said face and having a ridge parallel to said swivel axis, the other of said teeth being positioned at the other end of said face and having a ridge at a 90° angle with said ridge of said first of said teeth, whereby said jaw of said chuck provides a minimum positive four point contact when said chuck is engaging the workpiece.

9. A lathe chuck comprising a body and a plurality of movable jaws for engaging the wall of a generally cylindrical cavity in a workpiece, each of said jaws comprising a base mounted on said body in radially adjustable relation thereto, a swivel block having a shank for mounting said swivel block on said base, said base defining an axially extending bore for receiving said shank, said shank being positioned in said bore in swivel relation thereto about an axis substantially parallel to the axis of said chuck, said shank defining a radially extending clearance hole, a retaining bolt anchored in said base and extending into said clearance hole for limiting the axial movement of said swivel block relative to said base and for limiting the swivel action of said swivel block around said axis substantially parallel to said axis of said chuck, said swivel block defining two spaced apart slots having arcuate bottoms cut into the swivel block surface, said block being positionable to present said surface to the wall of the cavity in the workpiece, said slots being substantially parallel to and positioned one on either side of said swivel axis of said swivel block, rockers having an arcuate surface similar to said arcuate bottom partially enclosed in said slots with said arcuate surface positioned adjacent said arcuate bottom, each of said rockers having a clearance hole and a retaining pin passing therethrough for securing said rocker in the corresponding said slot in limited rocking relation to said swivel block, said retaining pin being mounted in said swivel block to form a limit stop for said rocker, each of said rockers having a face forming outwardly extending pyramidal teeth for engaging the workpiece, the first of said teeth being positioned at one end of said face and having a ridge parallel to said swivel axis of said block, the other of said teeth being positioned at the other end of said face and having a ridge at a 90° angle with said ridge of said first of said teeth, whereby each of said jaws of said chuck provides a positive four point contact when said chuck is engaging the workpiece.

10. A lathe chuck comprising a body and a plurality of movable jaws for engaging the periphery of a workpiece, said body having a plurality of spaced apart radially extending screws rotatably mounted in said body and radially restrained relative thereto, each of said movable jaws comprising a master jaw removably mounted on said body and threadedly engaging one of said screws for moving said movable jaw radially relative to said body, a base mounted on said master jaw, a swivel block mounted in said base in limited swivel relation thereto about an axis substantially parallel to the axis of said chuck, means cooperating with said base and said shank to limit the axial movement of said swivel block relative to said base and to limit the swivel action of said swivel block around said axis substantially parallel to said axis of said chuck, said swivel block defining two spaced apart slots having arcuate bottoms cut into the swivel block surface, said block being positionable to present said surface to the periphery of the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block to form a limit stop for said rocker, each of said rockers having a face forming outwardly extending pyramidal teeth for engaging the workpiece, the first of said teeth being positioned at one end of said face and having a ridge parallel to said swivel axis, the other of said teeth being positioned at the other end of said face and having a ridge at a 90° angle with said ridge of said first of said teeth, whereby said jaw of said chuck provides a minimum positive four point contact when said chuck is engaging the periphery of the workpiece.

11. A lathe chuck comprising a body and a plurality of movable jaws for engaging the wall of a generally cylindrical cavity in a workpiece, said body having a plurality of spaced apart radially extending screws rotatably mounted in said body and radially restrained relative thereto, each of said movable jaws comprising a master jaw removably mounted on said body and threadedly engaging one of said screws for moving said movable jaw radially relatively to said body, a base mounted on said master jaw, a swivel block mounted in said base in limited swivel relation thereto about an axis substantially parallel to the axis of said chuck, means cooperating with said base and said shank to limit the axial movement of said swivel block relative to said base and to limit the swivel action of said swivel block around said axis substantially parallel to said axis of said chuck, said swivel block defining two spaced apart slots having arcuate bottoms cut into the swivel block surface, said block being positionable to present said surface to the wall of the cavity in the workpiece, said slots extending substantially parallel to and positioned one on either side of said swivel axis of said swivel block, rockers partially enclosed in said slots, each of said rockers having a clearance hole and a retaining pin passing therethrough for securing said rocker in the corresponding said slot in limited rocking relation to said swivel block to form a limit stop for said rocker, each of said rockers having a face forming outwardly extending pyramidal teeth for engaging the workpiece, the first of said teeth being positioned at one end of said face and having a ridge parallel to said swivel axis, the other of said teeth being positioned at the other end of said face and having a ridge at a 90° angle with said ridge of said first of said teeth, whereby said jaw of said chuck provides a minimum positive four point contact when said chuck is engaging the wall of the cavity in the workpiece.

References Cited in the file of this patent

UNITED STATES PATENTS

| | | |
|---|---|---|
| 1,059,545 | Kunze | Apr. 22, 1913 |
| 1,918,439 | Warman | July 18, 1933 |
| 2,690,915 | Pealer | Oct. 5, 1954 |